US007996684B2

(12) United States Patent
Wasson et al.

(10) Patent No.: US 7,996,684 B2
(45) Date of Patent: Aug. 9, 2011

(54) APPARATUS AND METHOD FOR A PROGRAMMABLE SECURITY PROCESSOR

(75) Inventors: Stephen L. Wasson, Boulder Creek, CA (US); David K. Varn, San Jose, CA (US); John D. Ralston, Portola Valley, CA (US)

(73) Assignee: Infineon Technologies AG, Neubiberg (DE)

( * ) Notice: Subject to any disclaimer, the term of this patent is extended or adjusted under 35 U.S.C. 154(b) by 1378 days.

(21) Appl. No.: 11/435,010

(22) Filed: May 16, 2006

(65) Prior Publication Data

US 2006/0206726 A1    Sep. 14, 2006

Related U.S. Application Data

(62) Division of application No. 09/565,655, filed on May 5, 2000, now Pat. No. 7,073,069.

(60) Provisional application No. 60/133,131, filed on May 7, 1999.

(51) Int. Cl.
| G06F 11/30 | (2006.01) |
| G06F 7/04 | (2006.01) |
| G06F 15/76 | (2006.01) |
| H04L 29/06 | (2006.01) |
| H04L 9/00 | (2006.01) |
| G06F 15/78 | (2006.01) |
| G06F 17/50 | (2006.01) |
| H01L 21/82 | (2006.01) |
| H04N 5/262 | (2006.01) |
| H04B 7/26 | (2006.01) |

(52) U.S. Cl. ............ 713/189; 713/164; 713/173; 726/3; 726/11; 712/43; 380/44

(58) Field of Classification Search .................. 713/189, 713/164, 173; 380/44; 726/11, 3; 712/43
See application file for complete search history.

(56) References Cited

U.S. PATENT DOCUMENTS 4,935,734 A    6/1990 Austin et al.
5,448,698 A    9/1995 Wilkes
(Continued)

FOREIGN PATENT DOCUMENTS

EP    0 895 164    2/1999
(Continued)

OTHER PUBLICATIONS

Athanassios Boulis, Mani B. Srivastava; "System design of active basestations based on dynamically reconfigurable hardware", Jun. 2000; DAC '00: Proceedings of the 37th Annual Design Automation Conference, Publisher: ACM, pp. 501-506.*

(Continued)

*Primary Examiner* — Matthew B Smithers
*Assistant Examiner* — Courtney D Fields
(74) *Attorney, Agent, or Firm* — Dickstein Shapiro LLP

(57) ABSTRACT

A digital logic circuit comprises a programmable logic device and a programmable security circuit. The programmable security circuit stores a set of authorized configuration security keys. The programmable security circuit compares the authorized configuration security keys with an incoming configuration request, and selectively enables a new configuration for the programmable logic device in response to the configuration request. In another exemplary embodiment, a programmable security circuit also stores a set of authorized operation security keys. The programmable security circuit compares the authorized operation security keys with an incoming operation request from the programmable logic device, and selectively enables an operation within the programmable logic device in response to the operation request.

11 Claims, 14 Drawing Sheets

U.S. PATENT DOCUMENTS

| | | | |
|---|---|---|---|
| 5,499,192 A | 3/1996 | Knapp et al. | |
| 5,535,406 A | 7/1996 | Kolchinsky | |
| 5,682,478 A | 10/1997 | Watson et al. | |
| 5,848,231 A | 12/1998 | Teitelbaum et al. | |
| 5,896,499 A * | 4/1999 | McKelvey | 726/11 |
| 5,907,580 A | 5/1999 | Cummings | |
| 5,943,481 A | 8/1999 | Wakeland | |
| 6,006,321 A * | 12/1999 | Abbott | 712/43 |
| 6,029,245 A | 2/2000 | Scanlan | |
| 6,061,417 A | 5/2000 | Kelem | |
| 6,076,152 A | 6/2000 | Huppenthal et al. | |
| 6,118,869 A | 9/2000 | Kelem et al. | |
| 6,247,036 B1 | 6/2001 | Landers et al. | |
| 6,654,889 B1 | 11/2003 | Trimberger | |
| 6,671,810 B1 * | 12/2003 | Jardin | 726/3 |
| 6,721,581 B1 | 4/2004 | Subramanian | |
| 6,904,527 B1 | 6/2005 | Parlour et al. | |

FOREIGN PATENT DOCUMENTS

| | | |
|---|---|---|
| JP | 10-55135 A | 3/1989 |
| WO | WO-97/16003 | 5/1997 |
| WO | WO-2004/010320 | 1/2004 |
| WO | WO 2006059775 A2 * | 6/2006 |

OTHER PUBLICATIONS

Abnous et al., "Utlra-Low-Power Domain-Specific Multimedia Processors", Dept. of Electrical Engineering and Computer Sciences, University of California, Berkeley, CA, U.S.A., IEEE, pp. 461-470 (1996).

Mirsky et al., "Matrix: A Reconfigurable Computing Architecture with Configurable Instruction Distribution and Deployable Resources", FPGAS For Custom Computing Machines, 1996 Proceedings. IEEE Symposium on Napa Valley, CA, U.S.A., Apr. 17-19, 1996 & IEEE Comput. Soc., US, Los Alamitos, CA, U.S.A, , XP010206378, pp. 157-166.

Rupp, Ph.D. et al., "The NAPA Adaptive Processing Architecture", FPGAS For Custom Computing Machines, 1998 Proceedings, IEEE Symposium on Napa Valley, CA, U.S.A., Apr. 15-17, 1998 & IEEE Comput. Soc. US, Apr. 15, 1998, XP010298175, pp. 28-37.

Verbauwhede et al., "The Happy Marriage of Architecture and Application in Next-Generation Recongiurable Systems", Proceedings of the 1st Conference on Computing Frontiers, Publisher: ACM, CF'04, pp. 363-376 (Apr. 2000).

* cited by examiner

APPARATUS AND METHOD FOR A PROGRAMMABLE SECURITY PROCESSOR

This application is a divisional of application Ser. No. 09/565,655, filed on May 5, 2000, which claims priority to the provisional application bearing Ser. No. 60/133,131 filed on May 7, 1999. Each of the aforementioned prior application is hereby incorporated by reference in its entirety.

BRIEF DESCRIPTION OF THE INVENTION

This invention relates generally to communication systems. More particularly, this invention relates to a programmable reconfigurable security processor for an electronic communication device.

BACKGROUND OF THE INVENTION

Traditionally, electronic communication devices have been designed to perform a single function according to a single standard or application. As the sophistication of electronic communication devices increases, it is possible to design electronic devices that can perform multiple functions according to multiple standards or applications. The licensing or authorization of a product that performs according to a single standard is straightforward, since a license can be assigned to the product when it is sold. On the other hand, it is relatively difficult to provide a proper license or authorization to a device that operates according to multiple standards or applications.

In view of the foregoing, it would be highly desirable to provide a mechanism to operate an electronic communication device according to multiple standards or applications, wherein each standard is executed pursuant to proper authorization.

SUMMARY OF THE INVENTION

In one embodiment of the invention, a programmable reconfigurable security processor enables an electronic communication device to operate according to multiple standards, or to accommodate multiple applications, wherein each standard or application is executed pursuant to proper authorization. The programmable reconfigurable security processor can be exploited in any device in which different applications, algorithms, routines, or utilities may be loaded at or prior to run-time. For example, the security processor can be used to control licenses to intellectual property to enable new standards, applications, system upgrades, and trial periods. Furthermore, the security processor can perform real-time encryption and/or decryption of information streams. This embodiment of the invention can be successfully exploited in multi-mode products, such as multi-mode wireless telephones, information terminals, encryption equipment, and image and multimedia manipulation devices.

In a second embodiment of the invention, a digital logic circuit comprises a programmable logic device and a programmable security circuit. The programmable security circuit stores a set of authorized configuration security keys. The programmable security circuit compares the authorized configuration security keys with an incoming configuration request, and selectively enables a new configuration for the programmable logic device in response to the configuration request.

In another exemplary embodiment, the programmable security circuit also stores a set of authorized operation security keys. The programmable security circuit compares the authorized operation security keys with an incoming operation request from the programmable logic device, and selectively enables an operation within the programmable logic device in response to the operation request.

DETAILED DESCRIPTION OF THE INVENTION

Figure 1:
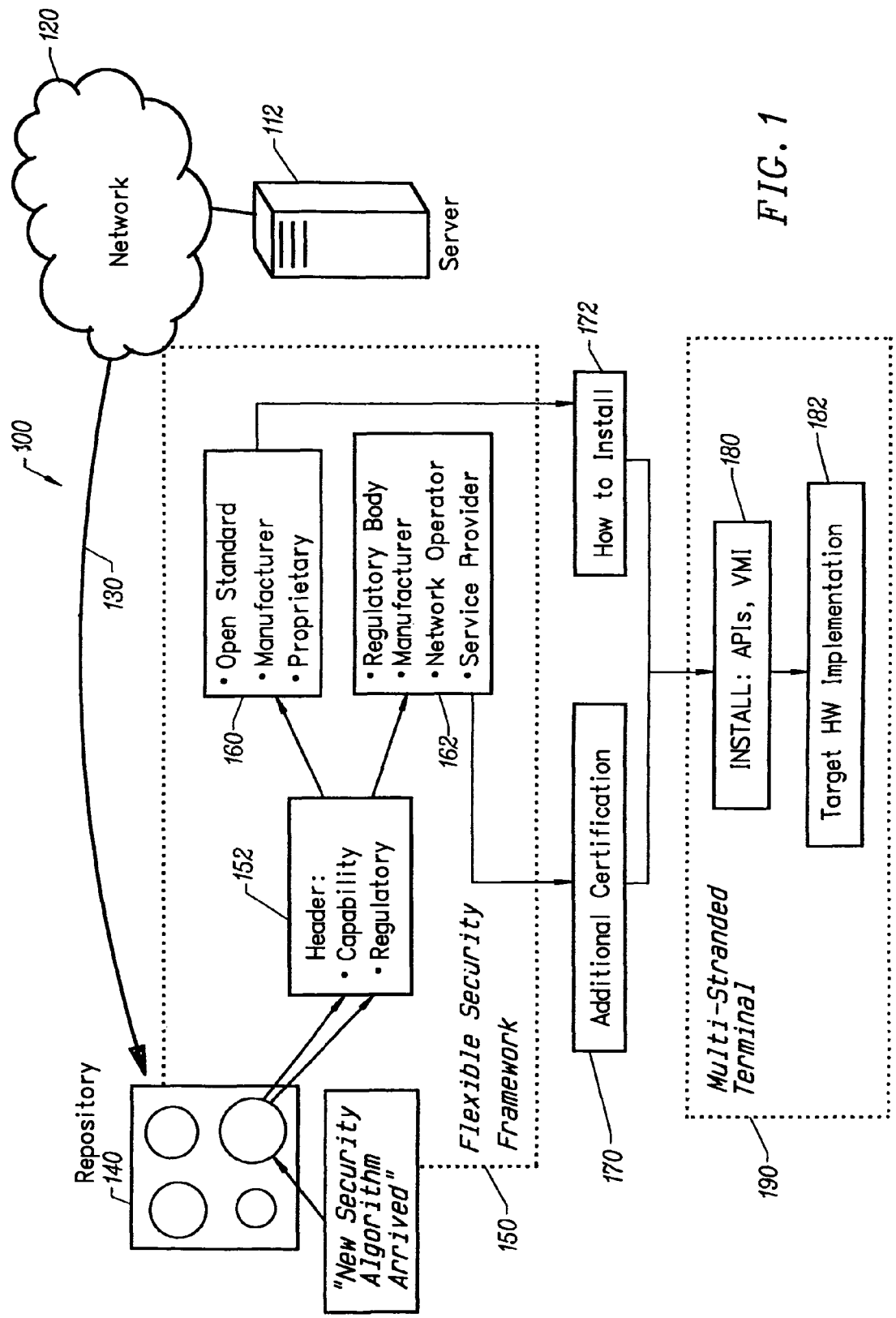
FIG. 1 illustrates an exemplary method for downloading a security algorithm across a network in accordance with an embodiment of the invention.

FIG. 1 illustrates an exemplary method by which a security algorithm is served by a server 112 across a network 120 to a mobile electronic communications terminal 190. The security algorithm can include, but is not limited to, a public key exchange and data encryption using a secret key. The security algorithm is issued by the server 112 and is sent across the network 120 through a communication link 130 to a repository 140 within the mobile terminal 190. The repository 140 signals the arrival of the security algorithm to the mobile terminal 190. A flexible security framework 150 establishes an identification mechanism for the security algorithm. In an exemplary embodiment, the security algorithm contains a header 152 that includes definitions of the security algorithm's capabilities and pertinent regulatory parameters/specifications.

The security algorithm's capabilities are categorized, for example, as open standard, manufacturer-specific, or proprietary. Further, the capabilities also include an installation procedure 172. Regulatory parameters/specifications include, for example, the source of the security algorithm and definition of additional certification 170. Using information contained in the header 152, installation can proceed based on vendor specified application program interfaces (APIs) and a virtual machine interface (VMI) 180. The VMI is essentially a software programmer's interface to the available hardware resources 182.

Figure 2:
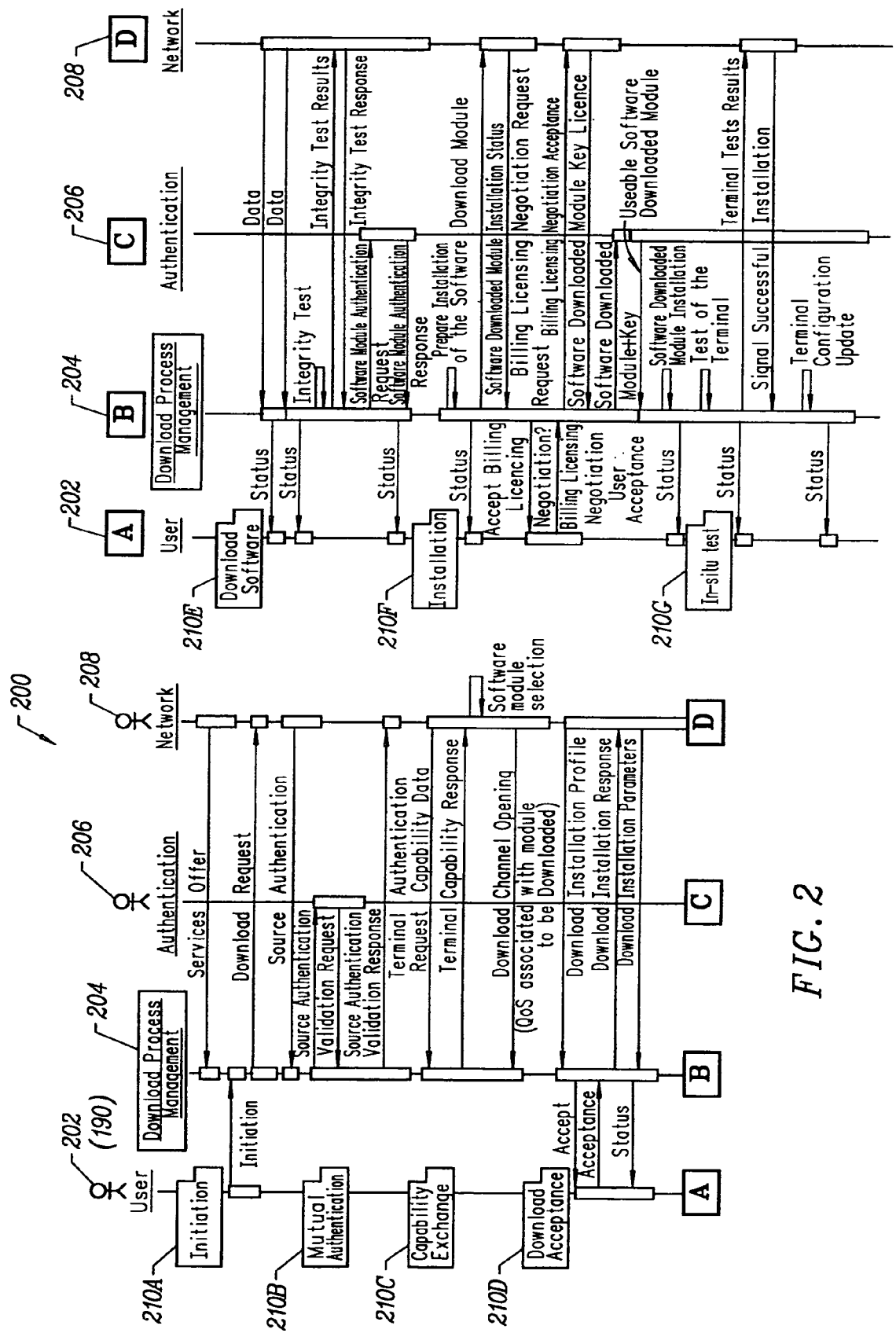
FIG. 2 illustrates an exemplary process for authorizing, executing, testing, and downloading a security algorithm across a network in accordance with an embodiment of the invention.

FIG. 2 illustrates an exemplary process in accordance with an embodiment of the invention. FIG. 2 includes a user 202, a download process management routine 204, an authentication function/party 206, and a network 208. In this exemplary embodiment, the user 202 operates a mobile communication terminal 190. The network 208 defines available security services. When the mobile terminal 190, which is controlled by the user 202, requests a specific service, the network 208 identifies itself for authentication purposes (step 210A). If the mobile terminal 190 requests an authentication to the authentication function/party 206 (i.e., by a trusted third party, TTP, or other authentication provider), authentication validation is returned to the mobile terminal 190 by the authentication function/party 206 (step 210B). The mobile terminal 190 then sends its authentication information to the network 208 (step 210B). Next, the network 208 requests and receives capability description from the mobile terminal 190 (step 210C). In response to the capability description, the network 208 selects an appropriate security algorithm and specifies the security algorithm to the mobile terminal 190, including the necessary quality of service (e.g., bit error rate) required to reliably deliver the selected security algorithm (step 210C). Next, the network 208 specifies and the mobile terminal 190 accepts a scenario for downloading the security algorithm (step 210D). The security algorithm is delivered to the mobile terminal 190, possibly in segments or data packets (step 210E). The mobile terminal 190 performs testing to confirm correct delivery and reports the testing results back to the network 208 (step 210E). The mobile terminal 190 then requests and receives another level of authentication (step 210E). Next, the mobile terminal 190 installs the security algorithm and confirms the installation to the network 208 (step 210F). Billing negotiations are transacted (step 210F). If the installed security algorithm requires additional components to affect end functionality, the mobile terminal 190 sends a key to the authentication function/party 206 to receive such additional software (step 210F). Additional software is downloaded and installed (step 210F). Finally, full functionality of the security algorithm is tested and confirmed by the mobile terminal 190 (step 210G).

Figure 3:
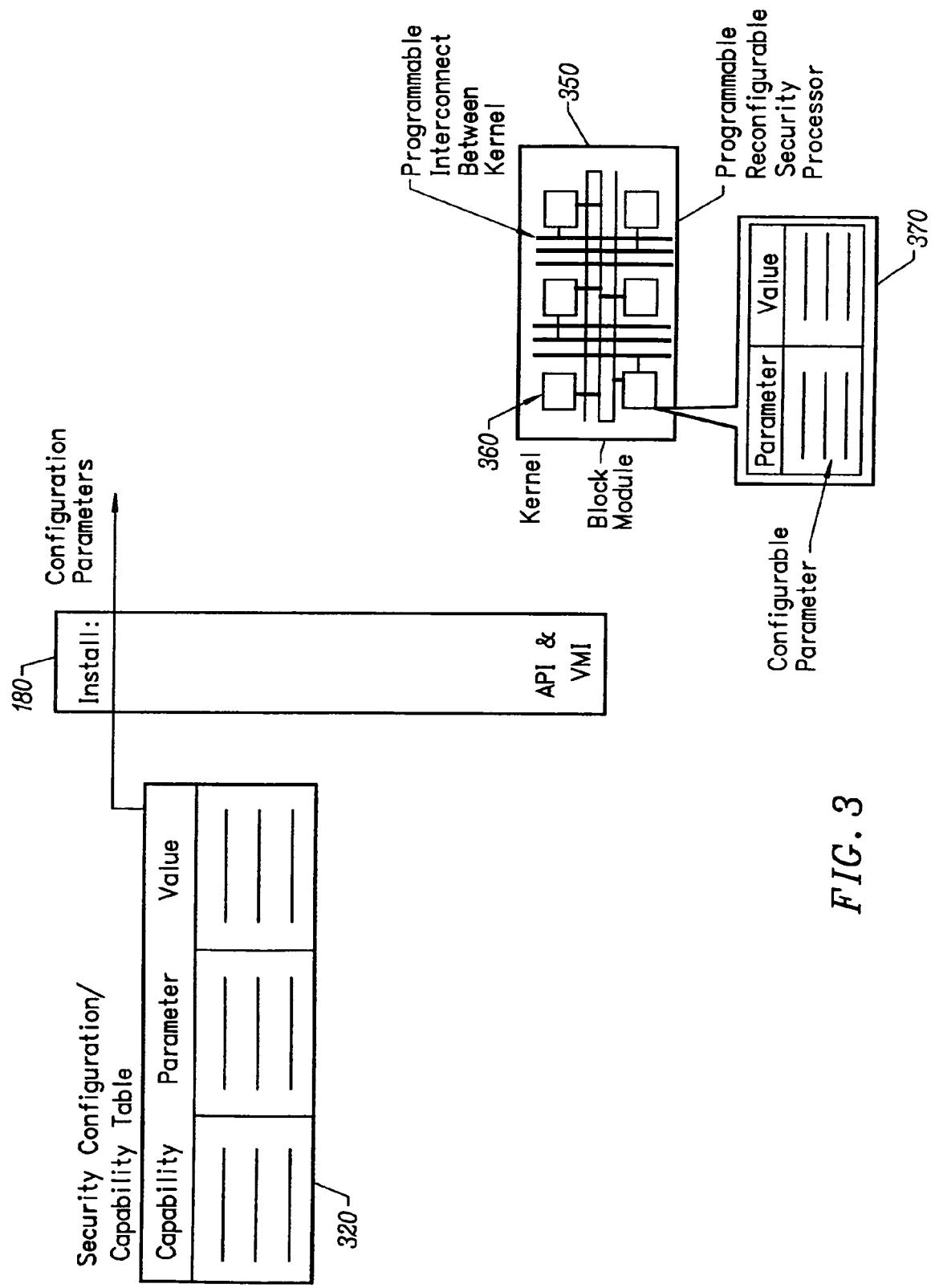
FIG. 3 illustrates an exemplary process for transferring the parameters of a security algorithm to a programmable reconfigurable security processor in accordance with an embodiment of the invention.

FIG. 3 illustrates an exemplary process for configuring a programmable reconfigurable security processor 350 in a multi-standard mobile communications terminal 190. Following receipt of a security algorithm, the header 152 of the security algorithm is processed to create a configuration table 320. The configuration table 320 includes specific security capabilities and corresponding parameters and values. Information provided in the configuration table 320 is passed through the mobile communication terminal's API and VMI 180 to the security processor 350. The security processor 350 comprises a number of parameterized hardware data processing kernels 360. The functionality of each kernel 360 is defined by a corresponding internal table 370. The contents of internal table 370 are set by the security processor 350 in accordance with definitions in the configuration table 320.

Figure 4A:
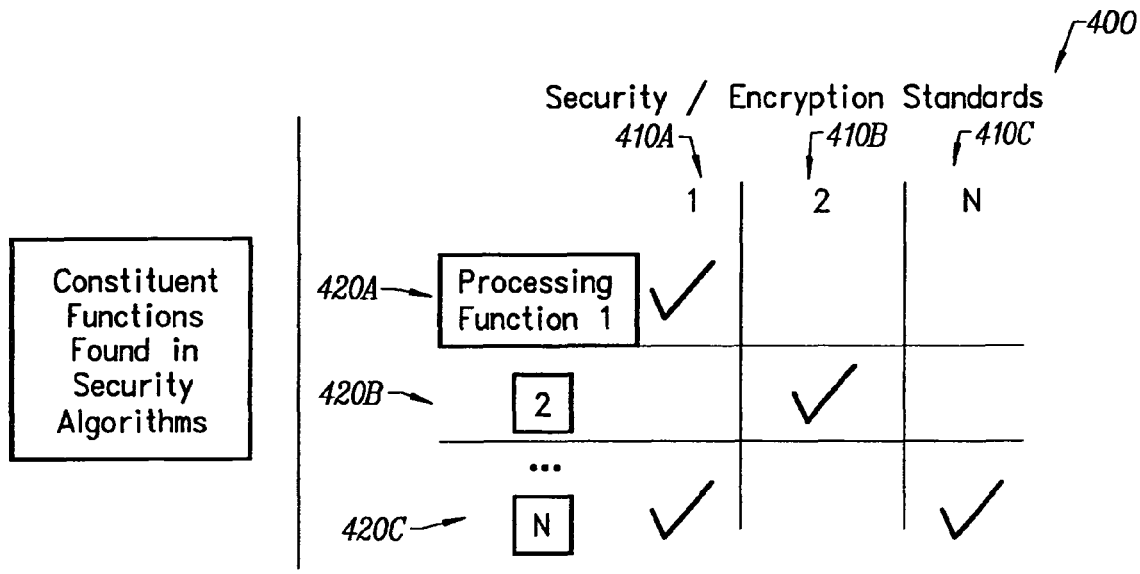
FIG. 4A illustrates an exemplary process for analyzing a set of security or encryption standards.

FIG. 4A illustrates an exemplary method for analyzing constituent algorithms for a programmable reconfigurable security processor 350. Multiple security standards or security algorithms are indicated in columns 410A, 410B, and 410C. Data processing functions pertinent to the various standards or algorithms are indicated in rows 420A, 420B, and 420C. Examples of security standards are AES, DES, RSA, MISTY, and IDEA. Based on a resulting matrix 400, the programmable reconfigurable security processor 350 is designed to implement constituent data processing functions of various security algorithms.

Figure 4B:
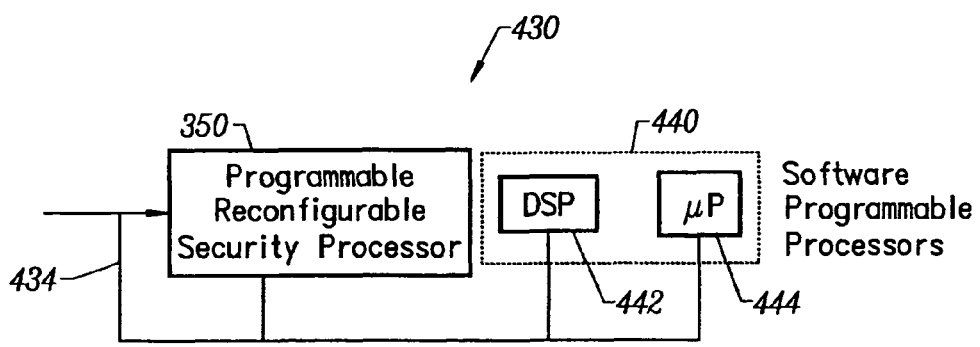
FIG. 4B illustrates an exemplary architecture including a programmable reconfigurable security processor in accordance with an embodiment of the invention

FIG. 4B illustrates an exemplary architecture 430 that is designed to implement constituent data processing functions of various security algorithms. The architecture 430 includes a programmable reconfigurable security processor 350, software programmable processors 440, and a communication bus 434. The software programmable processors 440 include a digital signal processor (DSP) 442 and a control microprocessor 444. The communication bus 434 links the control microprocessor 444, the DSP 442, and the programmable reconfigurable security processor 350. Data from the communication bus 434 is applied to the programmable reconfigurable security processor 350 and the software programmable processors 440. The programmable reconfigurable security processor 350 includes a set of parallel heterogeneous data processors (not shown) or kernels 360. The kernels 360 perform computationally intensive data processing functions and are selected and configured in a modular, non-redundant manner. Preferably, each kernel 360 and its interconnections can be quickly reconfigured, such that the architecture 430 can quickly (i.e., in milliseconds) switch from one security standard, application, or service to another. The DSP 442 performs the less computationally intensive data processing functions relative to functions performed by the kernels 360 in the programmable reconfigurable security processor 350. The control microprocessor 444 performs control and other functions.

Figure 5:
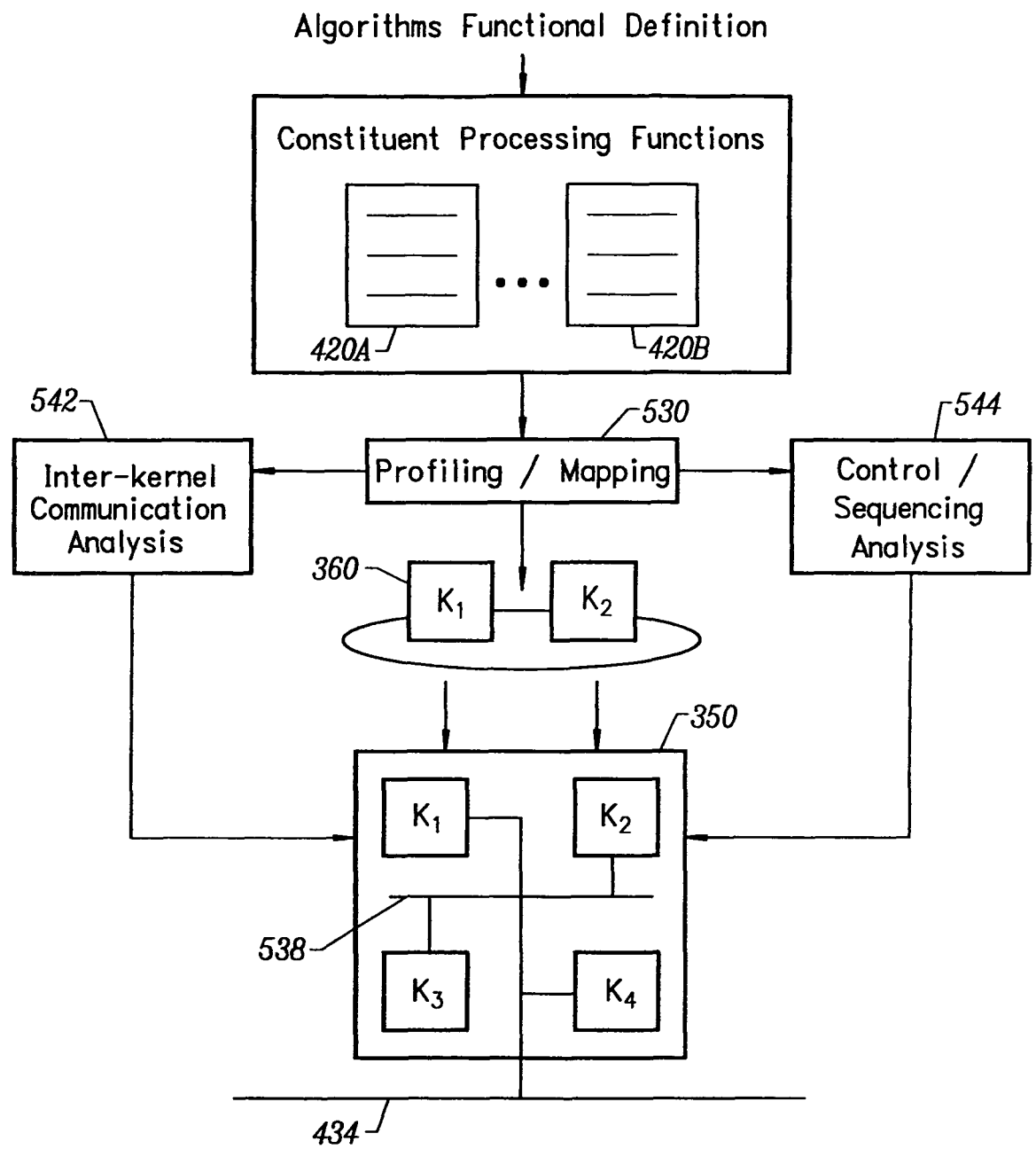
FIG. 5 illustrates an exemplary process for profiling a set of security or encryption standards to design a programmable reconfigurable security processor in accordance with an embodiment of the invention.

FIG. 5 illustrates an exemplary process for designing a programmable reconfigurable security processor 350. Constituent functions 420 are applied in a profiling/mapping analysis (step 530). The profiling/mapping analysis includes the step of analyzing each constituent function 420 to determine computational cost or intensity. The most computationally intensive constituent functions are mapped into one or more processing kernels 360 of the programmable reconfigurable security processor 350. The remaining functions are mapped into the DSP 442 and the control microprocessor 444. In addition, the profiling/mapping analysis evaluates inter-kernel communication signals (step 542) to determine the design of a reconfigurable data router 538. Data router 538 affects all necessary inter-kernel data transfer and interface to the communication bus 434. The profiling/mapping also evaluates kernel control and sequencing (step 544).

Figure 6A:
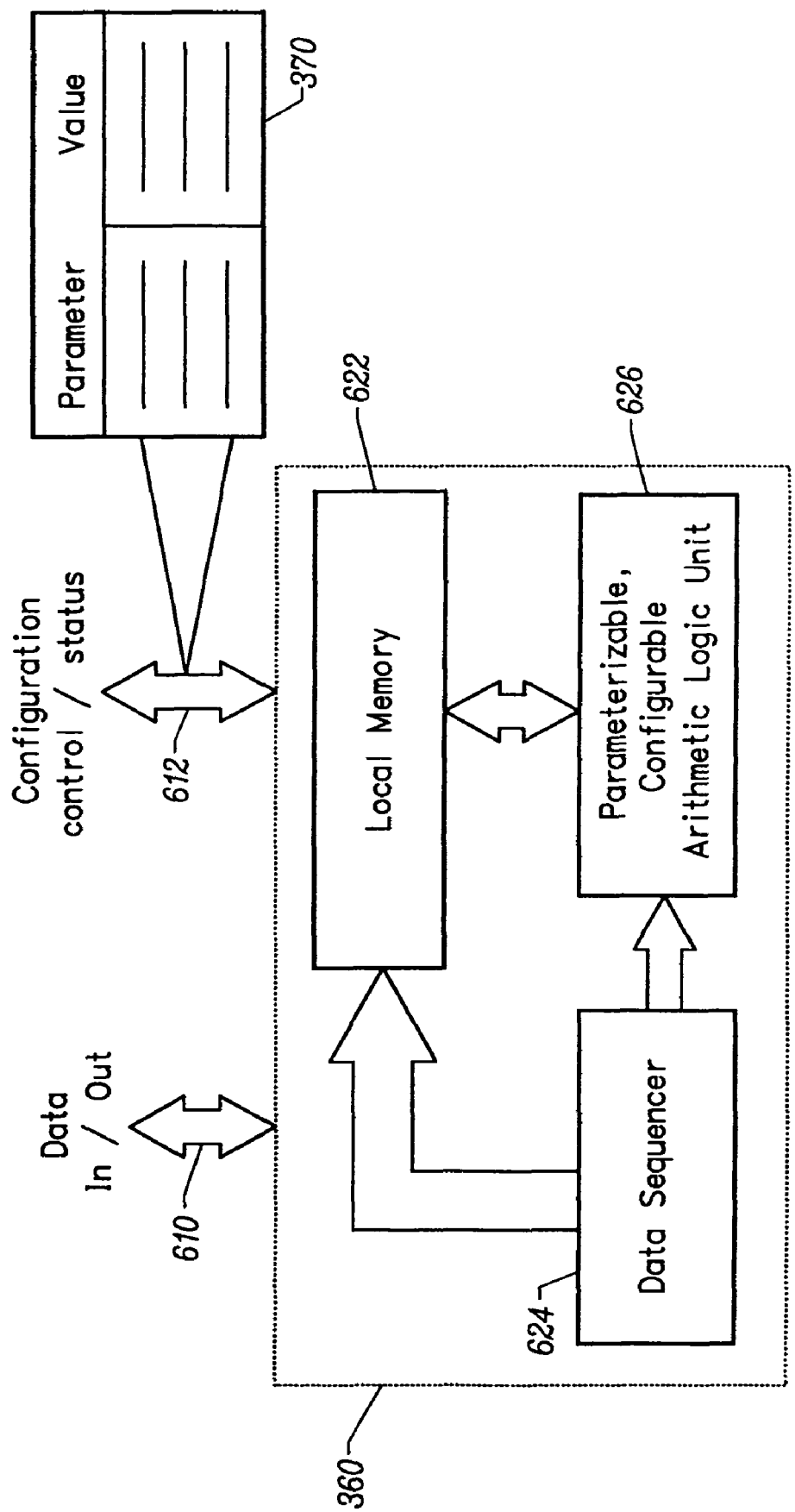
FIG. 6A illustrates an exemplary kernel in accordance with an embodiment of the invention.

FIG. 6A illustrates an exemplary kernel 360 in accordance with an embodiment of the invention. The kernel 360 includes a local memory 622, a data sequencer 624, and a parameterizable, configurable arithmetic logic unit (ALU) 626. The ALU 626 performs necessary data processing operations. The local memory 622 serves as a high-speed cache. The data sequencer 624 orchestrates the flow of data between the local memory 622 and the ALU 626. Data is transported into and out of the kernel 360 via a bus 610. Any configuration control or status signal is transported into and out of the kernel 360 via a bus 612. The configuration control is based on the parameter and value set forth in the internal table 370.

Figure 6B:
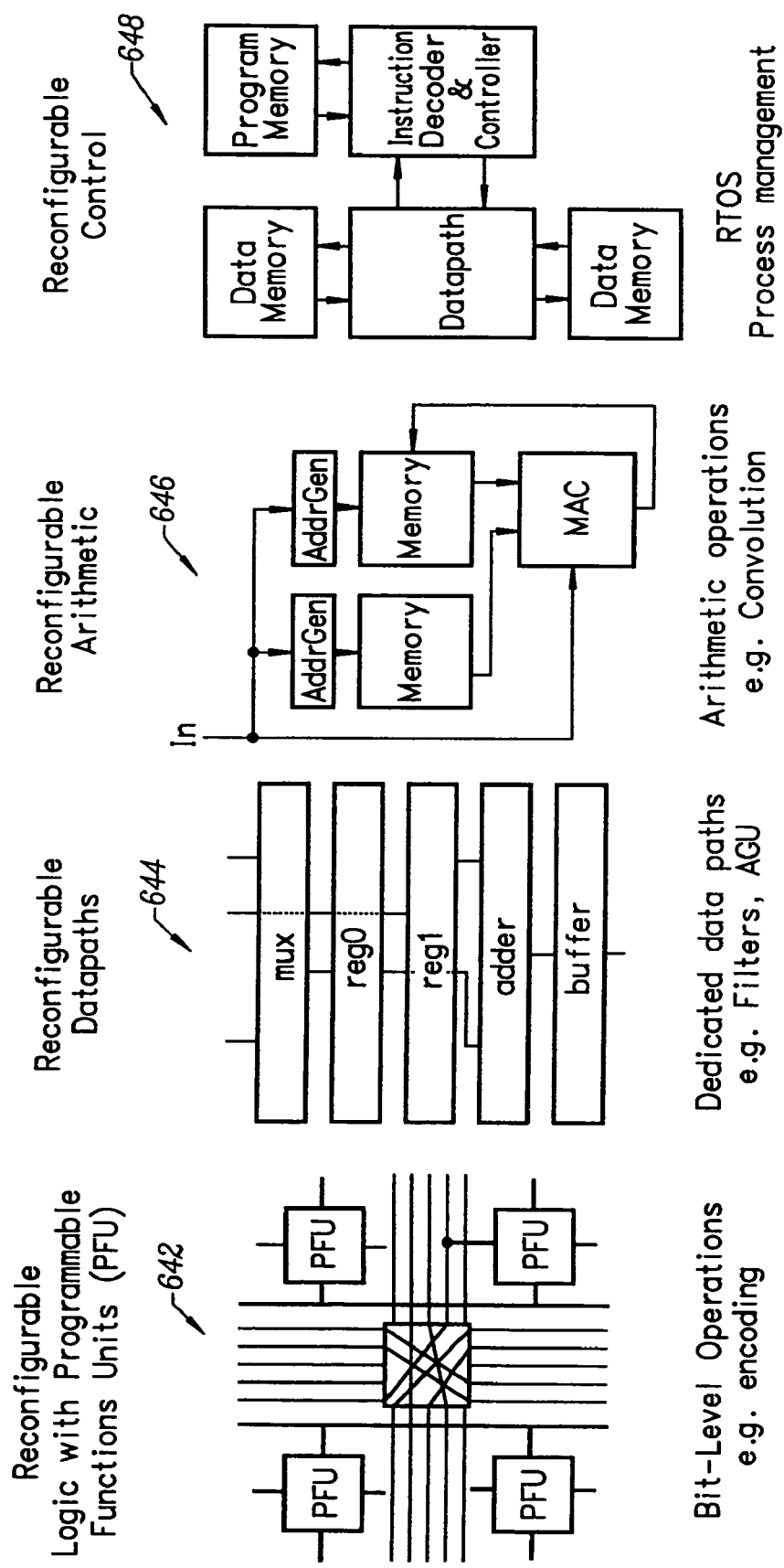
FIG. 6B illustrates exemplary reconfigurable data processing architectures that may be implemented by kernels of the invention.

FIG. 6B illustrates additional exemplary configurable architectures for a kernel 360. For example, any one of the four exemplary configurable architectures: reconfigurable logic with programmable function units 642, reconfigurable datapaths 644, reconfigurable arithmetic circuits 646, and reconfigurable control circuits 648 can be mapped into one or more kernels 360.

Figure 7:
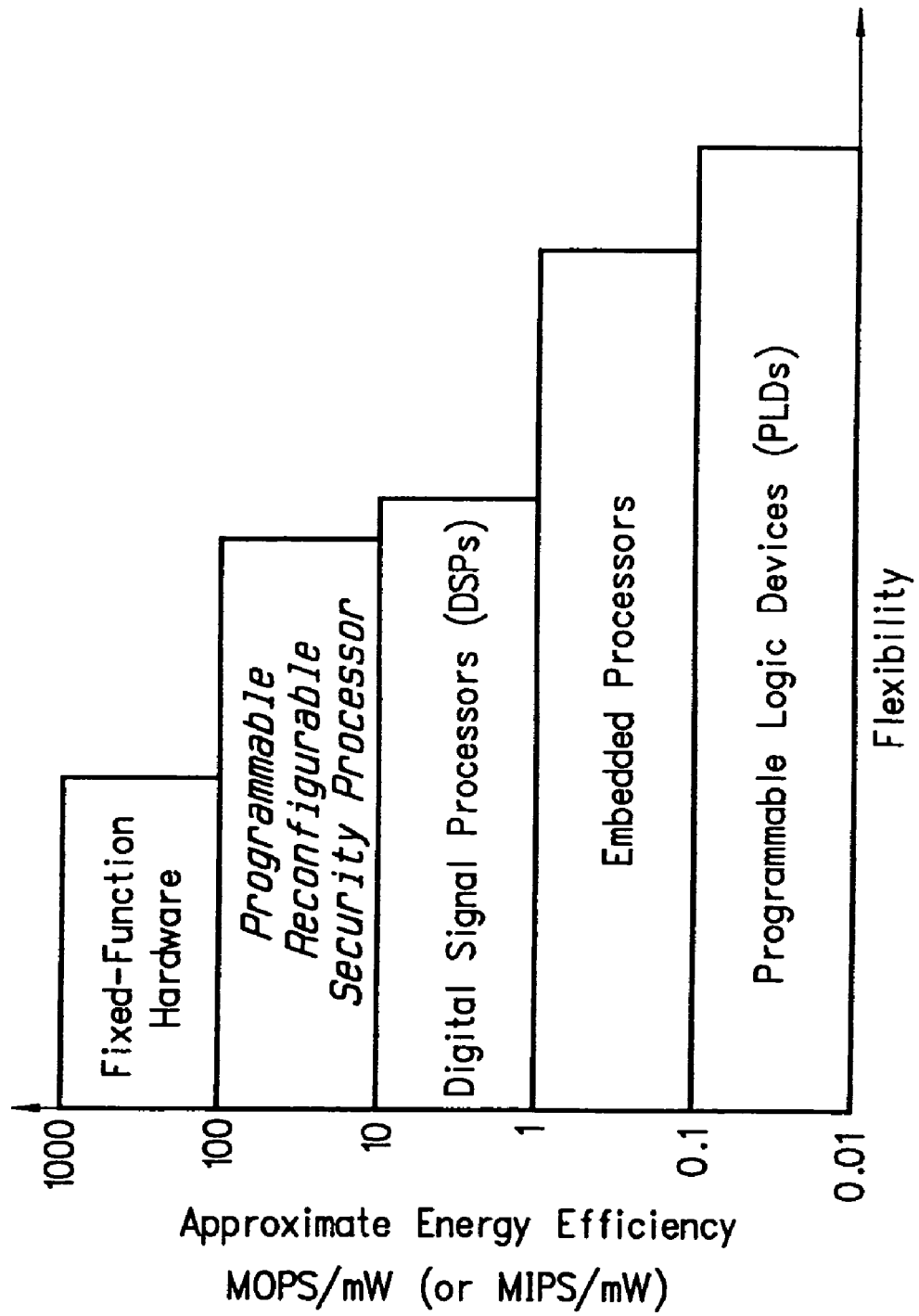
FIG. 7 illustrates characteristic energy efficiency versus flexibility for several types of fixed or programmable data processors.

FIG. 7 illustrates a comparison of the energy efficiency (evaluated in MOPS per milliwatt) and flexibility of among different types of devices. As shown in FIG. 7, the programmable reconfigurable security processor 350 is the second best in energy efficiency because it is optimized based on a set of security algorithms. Digital signal microprocessors and embedded processors are less efficient because of overhead required to support instruction-set programmability. Programmable logic devices (PLDs) are the least efficient because PLDs must employ general resources to permit fine-grained reconfiguration. Although the fixed-function hardware is the most efficient, it is not as desirable as the programmable reconfigurable security processor 350 because the fixed-function hardware is not as flexible.

Figure 8:
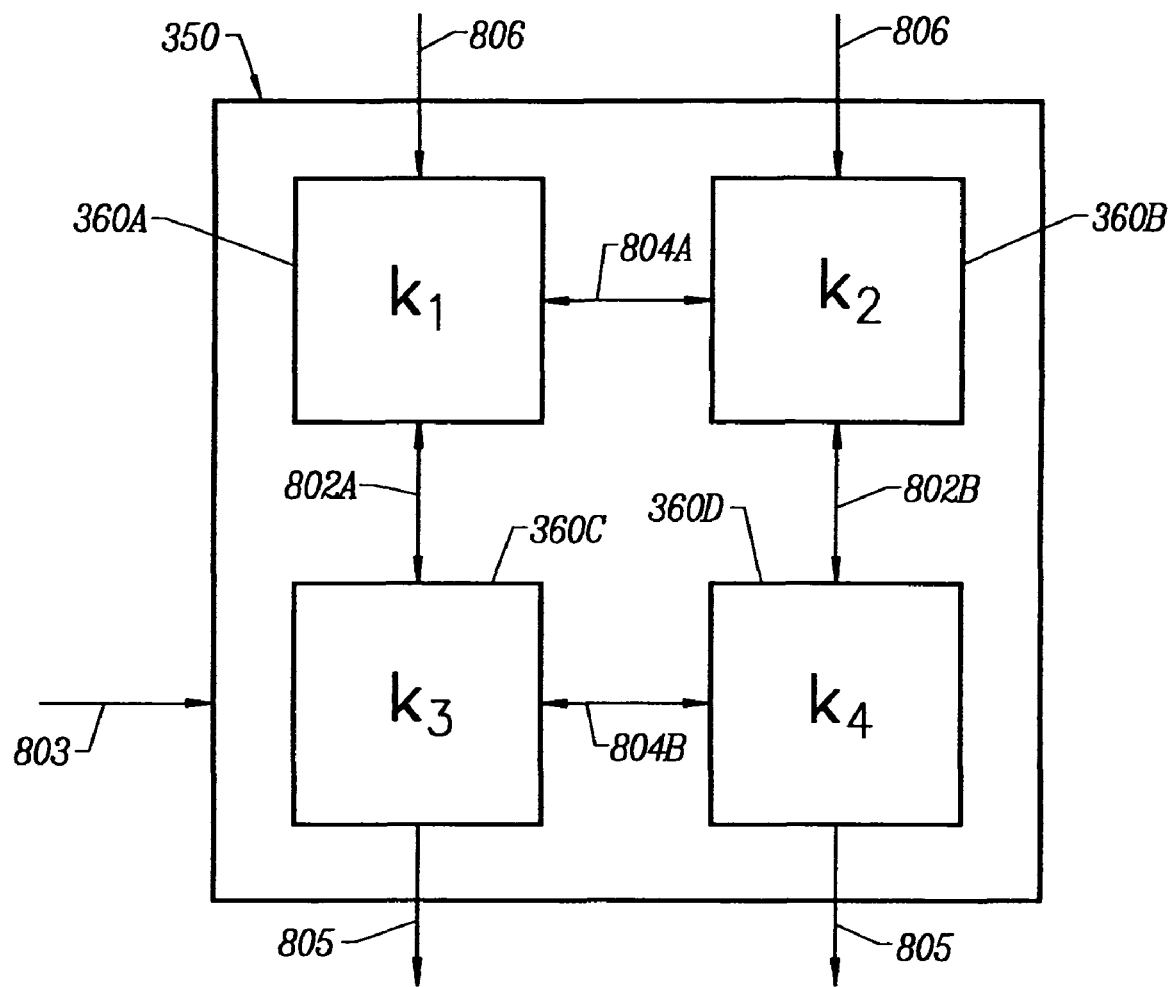
FIG. 8 illustrates a programmable reconfigurable security processor in accordance with an embodiment of the invention.
Figure 9:
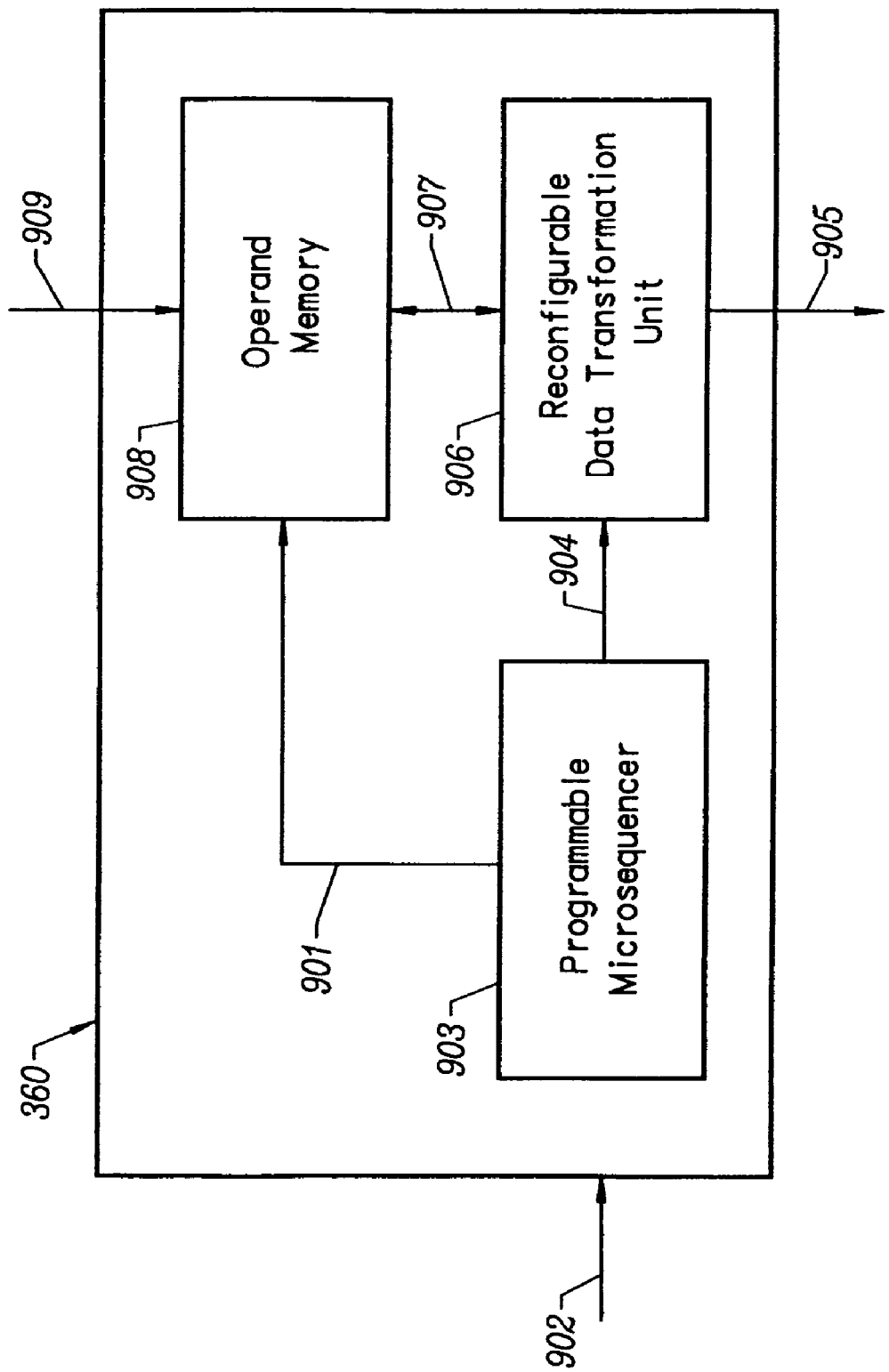
FIG. 9 illustrates an exemplary kernel in accordance with an embodiment of the invention.
Figure 10:
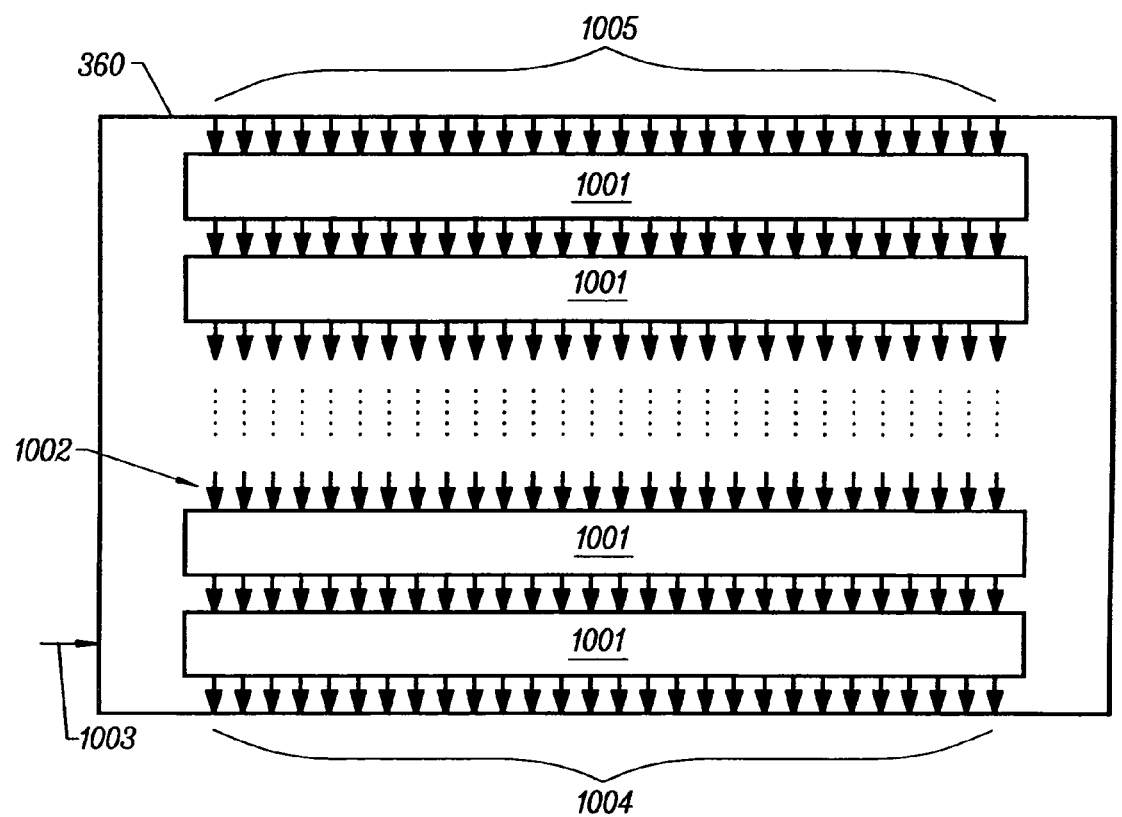
FIG. 10 illustrates an exemplary kernel in accordance with an embodiment of the invention.
Figure 11:
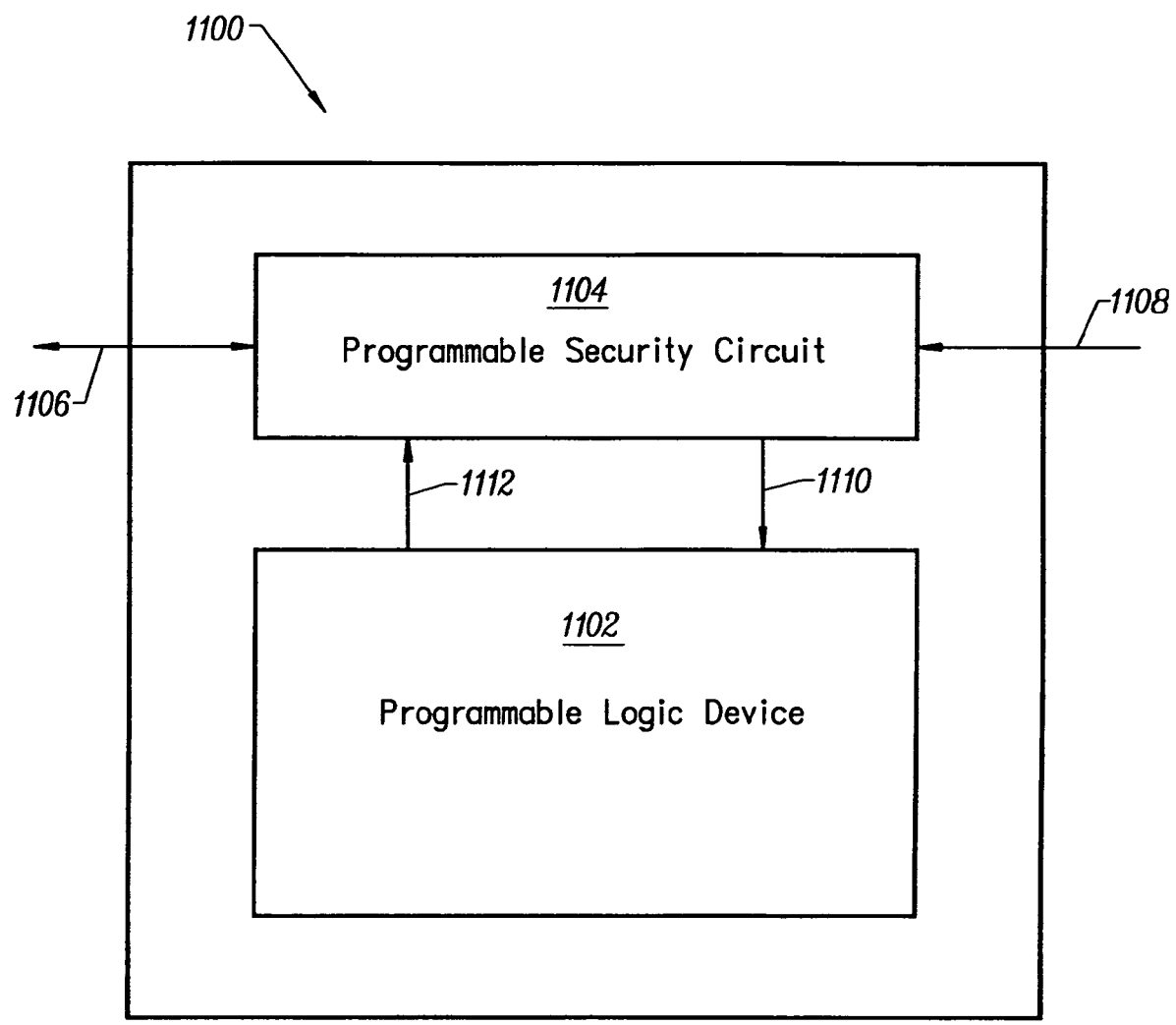
FIG. 11 illustrates an exemplary communications device with a programmable security circuit in accordance with an embodiment of the invention.
Figure 12:
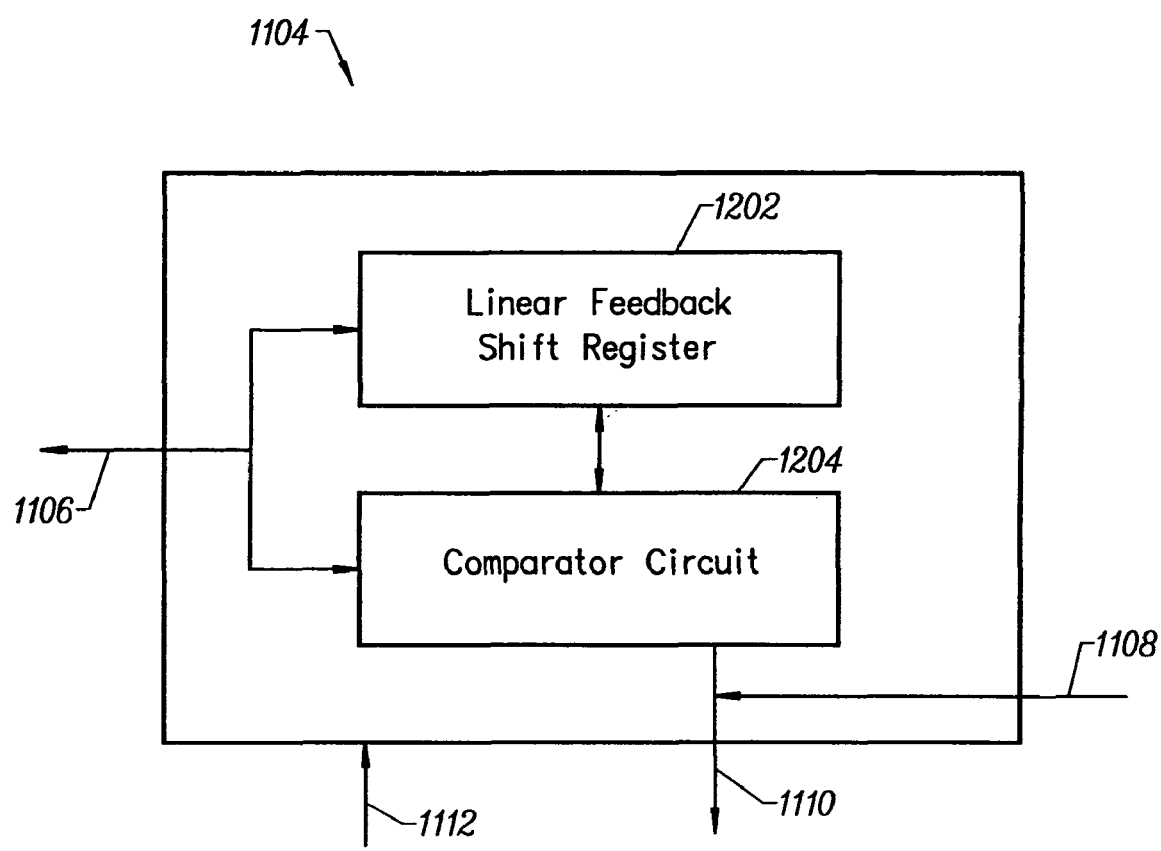
FIG. 12 illustrates an exemplary programmable security circuit in accordance with an embodiment of the invention.
Figure 13:
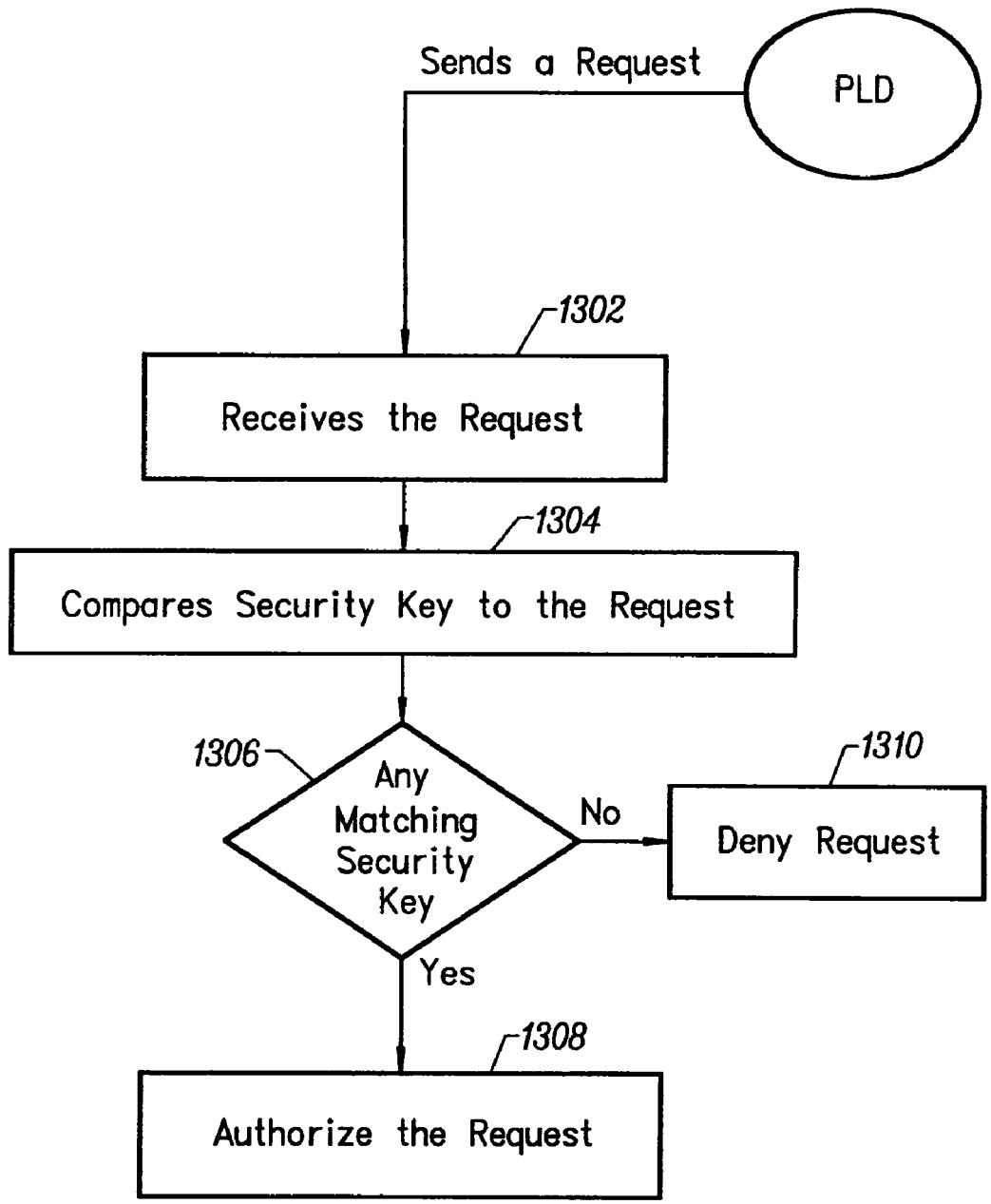
FIG. 13 illustrates a flow chart of an exemplary process in accordance with an embodiment of the invention.

The programmable reconfigurable security processor 350 can be employed to perform various functionality, for example, (1) to perform encryption/decryption of data, and 2) to perform encryption/decryption of configuration information. FIGS. 8, 9, and 10 illustrate the first exemplary functionality and FIGS. 11, 12, and 13 illustrate the second exemplary functionality.

FIG. 8 illustrates a programmable reconfigurable security processor 350. The security processor 350 includes a plurality of logic modules or kernels 360A, 360B, 360C, and 360D that are interconnected by signal sets 802 and 804. In one embodiment, the signal set 802 enables the kernels 360 adjacent in one dimension (i.e., vertically) to be cascaded. For example, kernel 360A and kernel 360C are cascaded by the signal 802A, such that the output of kernel 360A becomes the input of kernel 360C. Similarly, kernel 360B and kernel 360D are cascaded by the signal 802B, such that the output of kernel 360B becomes the input of kernel 360D. In another embodiment, the signal set 804 enables kernels 360 adjacent in another dimension (i.e., horizontally) to be concatenated. For example, kernel 360A and kernel 360B are concatenated by the signal 804A, such that the most significant stages of kernel 360B are passed to the least significant stages of kernel 360A. Similarly, kernel 360C and kernel 360D are concatenated by the signal 804B, such that the most significant stages of kernel 360D are passed to the least significant stages of kernel 360C. Moreover, kernels 360 are configured by input and control signal 803. Untransformed data is applied to kernels 360A and 360B via a signal set 806. Such untransformed data is processed by the kernels 360 and outputs via a signal set 805.

FIG. 9 illustrates an exemplary embodiment of a kernel 360. The kernel 360 implements a reduced instruction set computing element expressly optimized for computing encryption/decryption rounds. The kernel 360 comprises a programmable microsequencer 903, a reconfigurable data transformation unit 906, and an operand memory 908. The microsequencer 903 is designed to execute a highly reduced instruction set including, but not limited to, branch instructions and a limited number of input/output functions. The microsequencer 903 is configured by input and control signal 902, which is a subset of signal 803 in FIG. 8. The microsequencer 903 instruction word comprises at least an operation code (OP), a branch condition field (BC), a next-state field (NS), and an output function field (OF). The OP defines the type of instruction being executed, the BC determines what condition alters the course of instruction execution, the NS determines the branch destination, and the OF sources control signals to both the reconfigurable data transformation unit 906 and the operand memory 908.

Operations of reconfigurable data transformation unit 906 are controlled by two mechanisms, namely, the input and control signal 902 and a sequence control signal 904. Prior to run-time, the input and control signal 902 configures operations and constants to be used during an operation. During run-time, the sequence control signal 904 from the microsequencer 903 determines the micro-operation sequence. The reconfigurable data transformation unit 906 operations are optimized for computing encryption/decryption rounds. Operations include, but are not limited to, XOR, shift right, shift left, rotate right, rotate left, bit-serial multiple, substitution, permutation, and signal swap.

The operand memory 908 accepts data input from signal set 909, which is a subset of the signal set 806 in FIG. 8. Data is fetched from memory 908 according to a signal 901 from the microsequencer 903. Fetched data is passed to the reconfigurable data transformation unit 906 via a bi-directional signal 907 to be transformed according to the current configuration and the programmed sequence. The transformed data is either returned to the operand memory 908 via the bi-directional signal 907 or transferred out of the reconfigurable data transformation unit 906 via a signal set 905, which is a subset of the signal set 805 in FIG. 8.

In an exemplary embodiment, the microsequencer 903 is programmed to perform multiple rounds, thus, increasing the number of transformations executable by a single kernel 360. In another exemplary embodiment, the microsequencer 903 is programmed to execute multiple cycles on an input wider than is provided by the signal set 806, thus, effectively increasing the encryption/decryption word width. Alternatively, the same effect and benefit of programming a kernel to execute multiple cycles can be realized by concatenating adjacent kernels until the desired word width is obtained. Concatentaion consumes more resources but reduces the time to accomplish the same number of transformations.

In another exemplary embodiment, cascaded kernels can effectively implement consecutive rounds thereby decreasing overall latency. Moreover, cascaded kernels may be used to implement more complex algorithms such as encrypt-decrypt-encrypt.

FIG. 10 illustrates an exemplary higher performance encryption/decryption kernel 360. In FIG. 10, the kernel 360 comprises a pure datapath structure consisting of n-bit wide transformation slices 1001. The slices 1001 are configurable via input and control signal set 1003, which is a subset of the signal 803 in FIG. 8. The set of operations which a transformation slice 1001 may perform include, but is not limited to, XOR, shift right, shift left, rotate right, rotate left, bit-serial multiple, substitution, permutation, signal swap, and programmable delay. Once configured, the transformation slices 1001 perform a single operation per clock cycle. The output of one transformation slice 1001 is the input to the next transformation slice 1001 via an input signal set 1002. Kernel input is applied via a signal set 1005, which is a subset of the input signal set 806 in FIG. 8. Kernel output exits via a signal set 1004, which is a subset of the output signal set 805 in FIG. 8.

FIG. 11 illustrates an exemplary communication device 1100. The communication device 1100 includes a programmable logic device 1102 and a programmable security circuit 1104. The programmable logic device 1102 may be implemented as any known programmable logic circuit. For example, small, medium, or large granularity programmable logic blocks may be implemented in the programmable logic device 1102. The programmable security circuit 1104 is a programmable logic block that may be implemented as a volatile, non-volatile, static, or dynamic device.

In an exemplary embodiment, the programmable security circuit 1104 operates in two modes. In a first mode, the programmable security circuit 1104 provides authentication for new configurations of the programmable logic device 1102. In a second mode, the programmable security circuit 1104 provides authentication for selected operations to be performed by the programmable logic device 1102.

A security request and read-back line 1106 is used to program a set of security keys into the programmable security circuit 1104. Each security key specifies a permitted programmable logic device configuration or programmable logic device operation.

After the programmable security circuit 1104 is programmed, the security request and read-back line 1106 may be used to query the programmable security circuit 1104 to determine whether the programmable logic device 1102 can assume a new configuration. The programmable device 1100 also includes an external configuration data input line 1108 which provides new configurations to the programmable logic device 1102, a permission line 1110 which transfers new configuration to the programmable logic device 1102 when such new configuration is permitted or sends an enable signal to the programmable logic device 1102 when permission is granted by the programmable security circuit for requested operation, and an internal operation input line 1112 which passes requests from the programmable logic device 1102 to the programmable security circuit 1104 to perform operations.

FIG. 12 illustrates an exemplary embodiment of the programmable security circuit 1104. The programmable security circuit 1104 includes a linear feedback shift register 1202 and a comparator circuit 1204. The linear feedback shift register 1202 stores security keys through the read-back line 1106. After the security keys have been programmed into the linear feedback shift register 1202, the read-back line 1106 is used as a security request line. A programmable logic device 1102 (see FIG. 11) may request to perform an operation or to reconfigure itself in response to a control signal or a predetermined set of conditions. When an incoming request arrives at the programmable security circuit 1202 via the security request line 1106, the comparator circuit 1204 compares the security keys in the linear feedback shift register 1202 with the request input from the security request line 1106. If the comparator circuit 1204 finds a match between the request and one of the security keys stored in the linear feedback shift register 1202, the programmable security circuit 1104 may authorize the requested operation or reconfiguration. In the case of a request for reconfiguration, the proposed configuration may be downloaded over the external configuration data input line 1108. The proposed configuration is then passed into the programmable logic device 1102 via the permission line 1110 to reconfigure the programmable logic device 1102. If the comparator circuit 1204 does not find a match between the request and one of the security keys stored in the linear feedback shift register 1202, the programmable logic device 1102 will be inhibited from accepting the new configuration. In an exemplary embodiment, the programmable logic device 1102 sends requests through the internal operation input line 1112 to the programmable security circuit 1104 to verify acceptable operations. If the programmable security circuit 1104 contains a matching key for the requested operation, then an enable signal is sent via the permission line 1110, to enable the programmable logic device 1102 to perform the requested operation.

FIG. 13 illustrates an exemplary process in accordance with an embodiment of the invention. A request is sent to a programmable security circuit to perform a certain operation on or to reconfigure a programmable logic device. The programmable security circuit receives the request (step 1302). The programmable security circuit compares the request to a set of preprogrammed security keys (step 1304). If a match between the requested operation/configuration is found in the set of security keys (step 1306), the programmable security circuit authorizes the request (step 1308). If a match between the requested operation/configuration is not found in the set of security keys (step 1306), the programmable security circuit prohibits the PLD from accepting the new reconfiguration (step 1310). Alternately, the programmable security circuit returns a denial for the request for an impermissible operation.

Those skilled in the art will appreciate that the invention can be successfully exploited in any device in which different data, algorithms, routines, or utilities may be loaded at runtime. For example, the invention is useful in controlling licenses to intellectual property, such as for enabling new standards, system upgrades, and trial periods. Thus, the invention can be successfully exploited in multi-mode products, such as multi-mode wireless telephones, encryption equipment, and image manipulation devices.

The foregoing examples illustrate certain exemplary embodiments of the invention from which other embodiments, variations, and modifications will be apparent to those skilled in the art. The invention should therefore not be limited to the particular embodiments discussed above, but rather is defined by the following claims.

The invention claimed is:

1. A method for configuring a reconfigurable processor having a plurality of hardware data processing elements, the method comprising:
   receiving, at a repository, an algorithm across a network;
   creating a configuration table based at least in part on the algorithm;
   defining a functionality of at least one of the hardware data processing elements in a respective internal table based on the configuration table;
   and configuring the at least one of the hardware data processing elements based on the defined functionality.

2. The method according to claim 1, wherein the configuration table comprises security algorithms and data processing functions pertinent to the security algorithms.

3. The method according to claim 2, wherein the security algorithms are selected from the group of security algorithms consisting of AES, DES, RSA, MISTY, and IDEA.

4. The method according to claim 1, wherein the method is performed in a multi-standard mobile communications terminal.

5. The method according to claim 1, further comprising transmitting parameters from the configuration table through an application programming interface and a virtual machine interface to the hardware data processing elements.

6. A system for implementing a security algorithm, the system comprising:
   a reconfigurable security processor comprising hardware data processing elements,
   wherein each of the hardware data processing elements and its interconnections are reconfigurable based on a security algorithm received across a network, and
   wherein each of the hardware data processing elements comprises an internal table defining the functionality of the respective hardware data processing element based on the received security algorithm.

7. The system according to claim 6, further comprising a software processing unit coupled to the reconfigurable security processor by a communication bus.

8. The system according to claim 7, wherein the software processing unit comprises:
   a digital signal processor; and
   a control microprocessor.

9. The system according to claim 8, wherein each of the hardware data processing elements is configured to perform computationally intensive data processing functions, and the digital signal processor is configured to perform less computationally intensive data processing functions relative to the hardware data processing elements.

10. The system according to claim 6, wherein the security algorithm is selected from the group of security algorithms consisting of AES, DES, RSA, MISTY, and IDEA.

11. The system according to claim 6, wherein the content of each of the internal tables is set by the reconfigurable security processor in accordance with the received security algorithm.

* * * * *